(12) United States Patent
Lesher et al.

(10) Patent No.: US 10,067,897 B1
(45) Date of Patent: Sep. 4, 2018

(54) SYSTEM AND METHOD FOR DETERMINING THE POSITIONS OF SIDE COLLISION AVOIDANCE SENSORS ON A VEHICLE

(71) Applicant: Bendix Commercial Vehicle Systems LLC, Elyria, OH (US)

(72) Inventors: Michael K. Lesher, North Ridgeville, OH (US); Martin P. Franz, Portage, MI (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 15/584,632

(22) Filed: May 2, 2017

(51) Int. Cl.
*G01B 7/00* (2006.01)
*G06F 13/376* (2006.01)
(Continued)

(52) U.S. Cl.
CPC ........... *G06F 13/376* (2013.01); *B60Q 9/008* (2013.01); *G01B 7/003* (2013.01); *G01S 13/931* (2013.01); *G01S 15/931* (2013.01); *G08G 1/167* (2013.01); *B61L 15/0036* (2013.01); *B61L 23/041* (2013.01); *B61L 23/34* (2013.01);
(Continued)

(58) Field of Classification Search
CPC .... G01S 17/936; G01S 7/4972; G01S 13/931; G01S 2013/9371; G01S 2013/9353; G01S 7/52004; G01S 2013/9332; G01B 7/003; G01B 7/004; G01B 11/26; G01C 25/005;
(Continued)

(56) References Cited

U.S. PATENT DOCUMENTS 7,010,968 B2   3/2006   Stewart et al.
8,589,015 B2   11/2013  Willis et al.
(Continued)

FOREIGN PATENT DOCUMENTS

CN   101223417 B   4/2012
CN   103707728 A   4/2014
(Continued)

OTHER PUBLICATIONS

English language abstract of CN 103707728 A.
(Continued)

*Primary Examiner* — Benyam Haile
(74) *Attorney, Agent, or Firm* — Reising Ethington P.C.

(57) ABSTRACT

A system and method system for determining the positions of one or more collision avoidance sensors on a vehicle is provided. The system includes one or more sensors disposed on the vehicle and configured to generate electromagnetic waves within corresponding fields of view on a side of the vehicle and to receive reflections of the waves from objects passing through the field of view of each sensor. A controller receives signals generated by the sensors responsive to the reflections and determines, responsive to the signals, relative speeds and relative directions of movement of the objects relative to the vehicle. The controller further determines the position of the sensors on the vehicle responsive to the relative speeds and relative directions of movement. In particular, the controller determines the location of sensors relative to the vehicle centerline and the relative positions and distances between sensors in the direction of vehicle travel.

24 Claims, 6 Drawing Sheets

(51) Int. Cl.

| | |
|---|---|
| *G01S 13/93* | (2006.01) |
| *G08G 1/16* | (2006.01) |
| *B60Q 9/00* | (2006.01) |
| *G01S 15/93* | (2006.01) |
| *B61L 23/04* | (2006.01) |
| *B61L 15/00* | (2006.01) |
| *B61L 23/34* | (2006.01) |
| *B62D 41/00* | (2006.01) |
| *G01B 7/004* | (2006.01) |
| *G01S 7/52* | (2006.01) |
| *G01S 7/497* | (2006.01) |
| *G01P 21/00* | (2006.01) |
| *G01B 11/26* | (2006.01) |
| *G01S 17/93* | (2006.01) |

(52) U.S. Cl.
CPC .............. *B62D 41/00* (2013.01); *G01B 7/004* (2013.01); *G01B 11/26* (2013.01); *G01P 21/00* (2013.01); *G01S 7/4972* (2013.01); *G01S 7/52004* (2013.01); *G01S 17/936* (2013.01); *G01S 2013/9332* (2013.01); *G01S 2013/9353* (2013.01); *G01S 2013/9371* (2013.01); *G01S 2013/9385* (2013.01)

(58) Field of Classification Search
CPC ....... G01P 21/00; G06F 13/376; B60Q 9/008; B61L 23/041; B61L 23/34
See application file for complete search history.

(56) References Cited

U.S. PATENT DOCUMENTS

| | | | |
|---|---|---|---|
| 8,970,834 B2 | 3/2015 | Soininen et al. | |
| 2006/0017554 A1 | 1/2006 | Stewart et al. | |
| 2010/0253594 A1* | 10/2010 | Szczerba | G01S 13/723 345/7 |
| 2015/0276923 A1 | 10/2015 | Song et al. | |
| 2016/0161602 A1 | 6/2016 | Prokhorov | |
| 2016/0209211 A1* | 7/2016 | Song | G01B 21/24 |

FOREIGN PATENT DOCUMENTS

| | | | | |
|---|---|---|---|---|
| CN | 103770583 A | | 5/2014 | |
| DE | 10116278 A1 | * | 10/2002 | ........... G01S 7/4972 |
| DE | 10 2004 047 505 A1 | | 4/2006 | |
| DE | 10 2008 039 297 A1 | | 2/2010 | |
| DE | 10 2008 045 618 A1 | | 3/2010 | |
| KR | 100748891 B1 | | 8/2007 | |
| KR | 101571109 B1 | | 12/2015 | |

OTHER PUBLICATIONS

English language abstract of CN 103770583 A.
English language abstract of CN 101223417 B.
English language abstract of DE 10116278 A1.
English language abstract of DE 10 2004 047 505 A1.
English language abstract of DE 10 2008 039 297 A1.
English language abstract of DE 10 2008 045 618 A1.
English language abstract of KR 100748891 B1.
English language abstract of KR 101571109 B1.
Li, I.T. et al., "Multi-Target Multi-Platform Sensor Registration in Geodetic Coordinates," Proceedings of the International Society of Information Fusion pp. 366-373 (2002).
Bendix Commercial Vehicle Systems LLC, "Troubleshooting Guide—Bendix Blindspotter Collision Warning System" (Sep. 2011).
Bendix Commercial Vehicle Systems LLC, "Bendix Blindspotter Side Object Detection System," Service Data Sheet SD-61 4933 (2013).
Bendix Commercial Vehicle Systems LLC, "Installation Guide Bendix Blindspotter Side Object Detection System" (Apr. 2013).
Bendix Commercial Vehicle Systems LLC, "Bendix Wingman ACB (Active Cruise with Braking)," Service Data Sheet SD-13-3333 (2012).

* cited by examiner

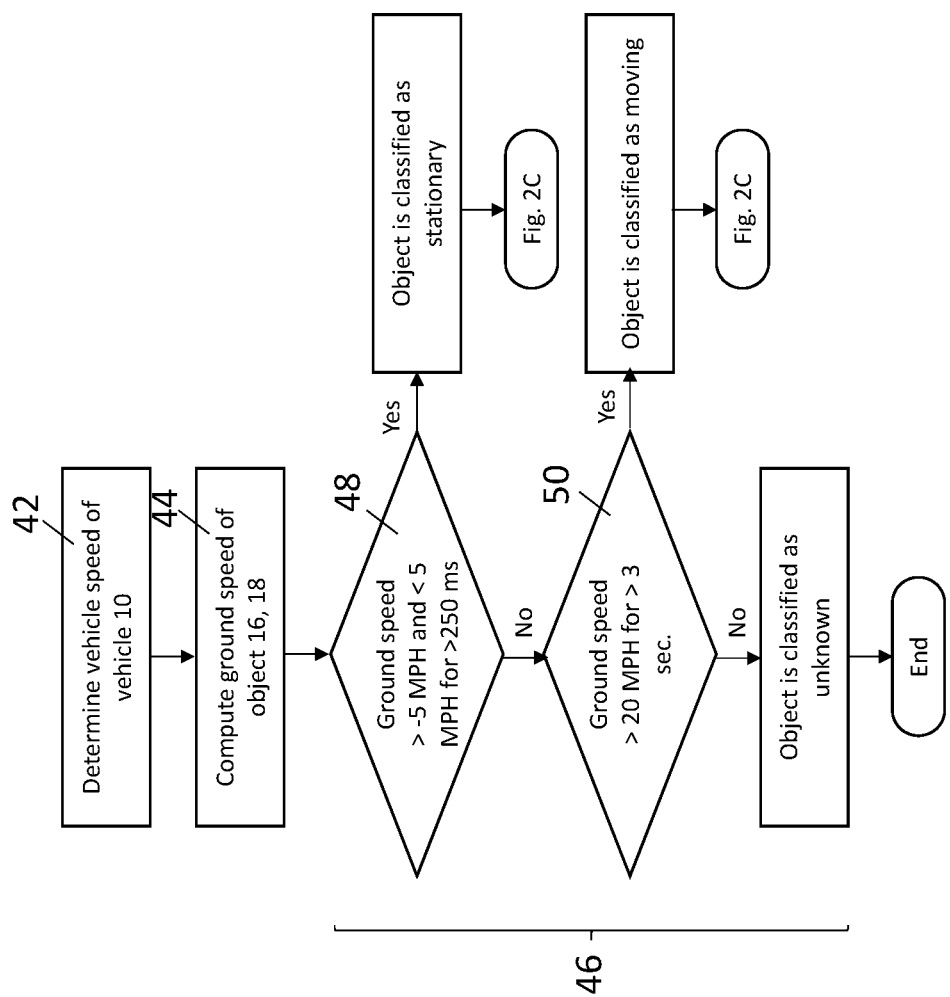

SYSTEM AND METHOD FOR DETERMINING THE POSITIONS OF SIDE COLLISION AVOIDANCE SENSORS ON A VEHICLE

BACKGROUND OF THE INVENTION a. Field of the Invention

This invention relates to side collision avoidance systems for vehicles. In particular, the invention relates to a system and method for determining the position of collision avoidance sensors on the sides of a vehicle.

b. Background Art

Collision avoidance systems are used in vehicles to prevent collisions between the vehicle and other objects (including other vehicles, pedestrians, and stationary objects such as guardrails) and to reduce the severity of any collisions that do occur. One conventional form of collision avoidance system commonly used on vehicles today is a blind spot monitoring system. Blind spots are areas on or along the roadway that cannot be seen by the vehicle operator using conventional rear view or side view mirrors on the vehicle. Blind spot monitoring systems generate warnings to the vehicle operator when an object is located in a blind spot to discourage the operator from moving the vehicle in a direction that will cause a collision with the object. Some blind spot monitoring systems may further function as, or work with, lane keeping assist systems to take action autonomously (without action by the vehicle operator) to move or prevent movement of the vehicle to avoid a collision.

Blind spot monitoring systems employ sensors located on either side of the vehicle in order to detect objects in blind spots on either side of the vehicle. When objects are detected, the sensors generate signals along a vehicle communications bus. These signals may, for example, be used to generate an audio or visual warning to the vehicle operator that an object is located within a blind spot. For any given signal, it is important to know the position on the vehicle of the sensor that generated the signal in order to provide an appropriate warning to the vehicle operator regarding the location of an object and/or to prevent or cause movement of the vehicle in a particular direction to avoid a collision with the object. Conventional sensors are pre-programmed by the manufacturer of the sensor for use in specific positions on the vehicle. As a result, the manufacturer has to produce a plurality of different sensors. For example, Society of Automotive Engineers (SAE) Standard J1939 specifies eight different positions for side collision sensors (front left, mid front left, mid rear left, rear left, front right, mid front right, mid rear right, rear right). In addition to the manufacturing costs associated with producing multiple sensors, there is a risk that sensors pre-programmed for one position will be installed in another position on the vehicle during the initial installation of the sensors and/or that an incorrect sensor will be installed when replacing a sensor during a maintenance action. It is therefore desirable to be able to use a single sensor that can be installed at any of the multiple potential positions on the vehicle. Sensors have been taught to "learn" the position where they have been installed by using different wiring connections at different positions. This method, however, requires the use of different wiring connections and therefore simply transfers the increase in part count to another vehicle component.

The inventors herein have recognized a need for a system and method for determining the position of a collision avoidance sensor on the vehicle that will minimize and/or eliminate one or more of the above-identified deficiencies.

BRIEF SUMMARY OF THE INVENTION

This invention relates to side collision avoidance systems for vehicles. In particular, the invention relates to a system and method for determining the position of collision avoidance sensors on the sides of a vehicle A system for determining the positions of one or more collision avoidance sensors on a vehicle in accordance with one embodiment includes a sensor disposed on the vehicle. The sensor is configured to generate an electromagnetic wave within a field of view on a side of the vehicle and to receive a reflection of the electromagnetic wave from an object passing through the field of view. The system further includes a controller configured to receive a signal generated by the sensor responsive to the reflection of the electromagnetic wave by the object. The controller is further configured to determine, responsive to the signal, a relative speed of the object relative to the vehicle. The controller is further configured to determine, responsive to the signal, a relative direction of movement of the object relative to the vehicle. The controller is further configured to determine a position of the sensor on the vehicle responsive to the relative speed and the relative direction of movement.

An article of manufacture in accordance with one embodiment includes a non-transitory computer storage medium having a computer program encoded thereon that when executed by a controller determines the positions of one or more collision avoidance sensors on a vehicle. The computer program includes code for determining a relative speed of an object relative to the vehicle. The determination is responsive to a signal generated by a sensor disposed on the vehicle. The signal is generated by the sensor in response to reflection by the object of an electromagnetic wave generated by the sensor within a field of view on a side of the vehicle when the object passes through the field of view. The computer program further includes code for determining, responsive to the signal, a relative direction of movement of the object relative to the vehicle. The computer program further includes code for determining a position of the sensor on the vehicle responsive to the relative speed and the relative direction of movement.

A method for determining the positions of one or more collision avoidance sensors on a vehicle in accordance with one embodiment includes generating an electromagnetic wave from a sensor disposed on the vehicle, the electromagnetic wave generated within a field of view on a side of the vehicle. The method further includes the steps of receiving a reflection of the electromagnetic wave from an object passing through the field of view and generating a signal from the sensor responsive to the reflection of the electromagnetic wave by the object. The method further includes the step of determining, responsive to the signal, a relative speed of the object relative to the vehicle. The method further includes the step of determining, responsive to the signal, a relative direction of movement of the object relative to the vehicle. The method further includes the step of determining a position of the sensor on the vehicle responsive to the relative speed and the relative direction of movement.

A system and method for determining the positions of one or more collision avoidance sensors on a vehicle in accordance the present teachings represent an improvement as compared to conventional systems and methods. In particular, the system and method enable a sensor to learn its position on the vehicle as well as its position relative to other sensors based on the speed and direction of movement of objects in the field of view of the sensor relative to the speed and direction of movement of the vehicle. As a result, a single sensor can be used at any position on the vehicle without modifications to other vehicle components. By using a single sensor, manufacturers avoid the costs of manufacturing and programming multiple sensors. Further, installation of the sensors on a vehicle is much quicker and the risk of improper installation of the sensor is significantly reduced.

The foregoing and other aspects, features, details, utilities, and advantages of the present invention will be apparent from reading the following description and claims, and from reviewing the accompanying drawings.

BRIEF DESCRIPTION OF THE DRAWINGS

FIGS. 2A-2E are flow chart diagrams illustrating a method for determining the position of one of more collision avoidance sensors on the vehicle in accordance with one embodiment of the present teachings.

DETAILED DESCRIPTION OF THE INVENTION

Figure 1:
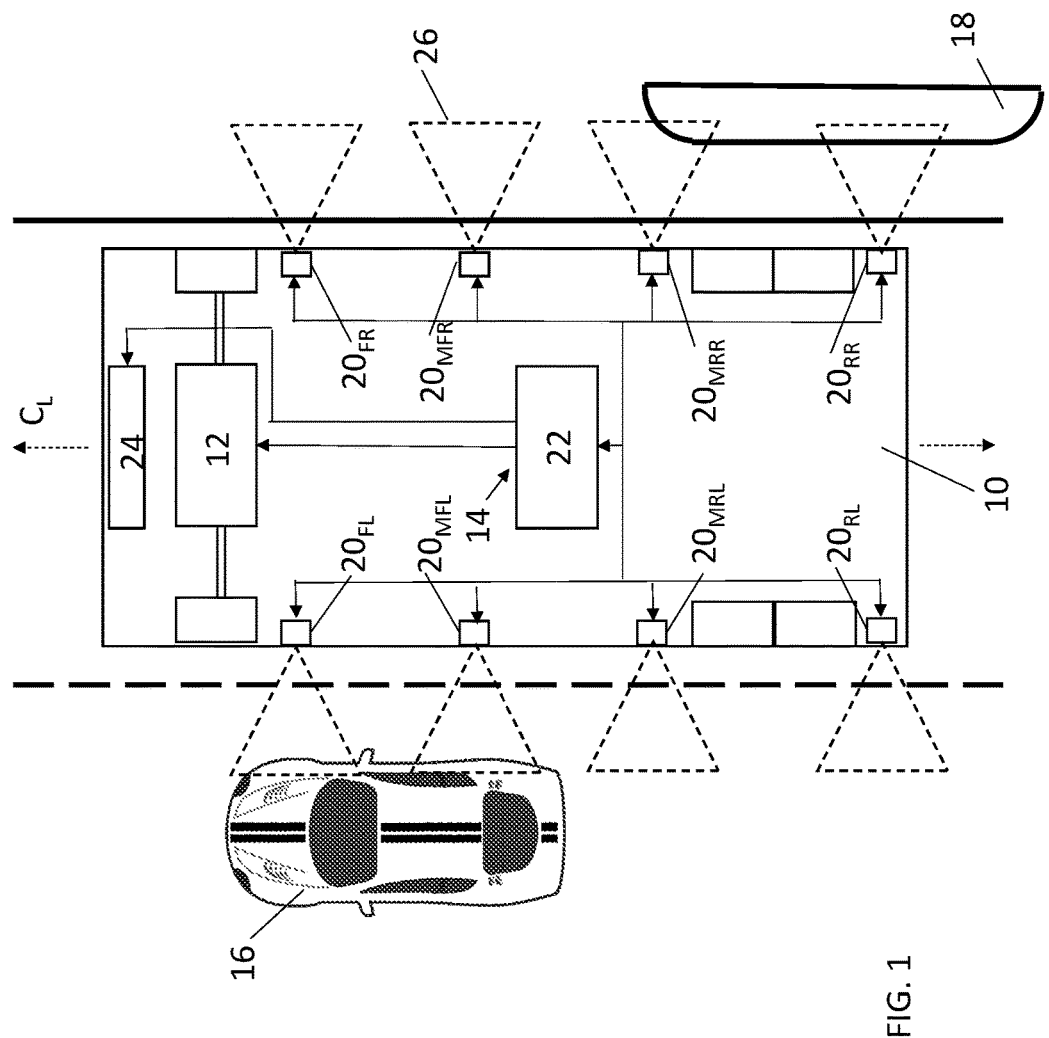
FIG. 1 is a diagrammatic view of a vehicle including a system for determining the position of one of more collision avoidance sensors on the vehicle in accordance with one embodiment of the present teachings.

Referring now to the drawings wherein like reference numerals are used to identify identical components in the various views, FIG. 1 illustrates a vehicle 10. In accordance with certain embodiments, vehicle 10 may include an electric power steering system 12. Vehicle 10 further includes a collision avoidance system in the form or a side object detection system or blind spot monitoring system 14. Vehicle 10 may comprise a heavy commercial vehicle such as a truck, trailers or bus, but it should be understood that systems 12 and 14 may find application on a wide variety of vehicles.

Electric power steering system 12 provides assistance to the vehicle operator to turn the vehicle wheels and steer vehicle 10. System 12 may also provide the ability for autonomous steering of vehicle 10 without input from the vehicle operator. System 12 may include a conventional electric motor that moves a steering rack connected to wheels on opposite side of the vehicle in response to rotation of the steering wheel by the vehicle operator. Steering angle and torque sensors on the steering column output signals to a controller for the electric motor. The controller may also receive inputs from various collision avoidance systems including lane keeping assist or lane centering assist systems that employ cameras or other sensors to detect lane lines and attempt to maintain vehicle 10 between the lane lines in the absence of a demonstrated intent by the vehicle operator to cross a line (e.g. use of a turn signal). In accordance with the present teachings, the controller for the motor may also receive inputs from system 14 which may, in some embodiments, generate control signals intended to prevent collision of the vehicle with an object in a blind spot of the vehicle.

System 14 is provided to identify objects 16, 18 on either side of vehicle 10 and, in particular, in blind spots of vehicle 10. Blind spots generally comprise areas surrounding the vehicle that cannot be seen by the vehicle operator using the rear view and side view mirrors on the vehicle. It should be understood, however, that system 12 may be capable of identifying objects that are in areas on either side of vehicle 10 that do not comprise blind spots. Objects 16, 18 identified by system 12 may comprise objects that are in motion such as other vehicles or pedestrians as illustrated by object 16 in the drawings. Objects 16, 18 may also comprise objects that are stationary including guard rails, signs and other road infrastructure as illustrated by object 18 in the drawings. System 14 may include one or more sensors 20, a controller 22 and an operator interface 24 that communicate with one another over a conventional vehicle communications bus and, in particular, a controller area network (CAN). In accordance with the present teachings, portions of system 14 are configured to determine the position of sensors 20 on vehicle 10 in order to allow system 14 to correctly identify the location of objects 16, 18 detected by sensors 20.

Sensors 20 having a defined field of view 26 are provided to identify objects 16, 18. Sensors 20 may comprise radar (radio detection and ranging) sensors, but may also comprise lidar (light detection and ranging) sensors. In the illustrated embodiment, vehicle 10 includes eight sensors 20 with four sensors located on each side of vehicle 10. It should be understood, however, that the number of sensors 20 may vary. Further, in some vehicles, sensors 20 may be located on only one side of the vehicle (e.g., the passenger side). Each sensor 20 is configured to generate electromagnetic waves within a corresponding field of view 26 on one side of vehicle 10. The waves will reflect off of any objects 16, 18 that pass through the field of view 26. Each sensor 20 is further configured to receive reflections of the electromagnetic waves from any objects 16, 18 passing through the field of view 26 as a result of relative motion between vehicle 10 and objects 16, 18. In the case of radar sensors, waves may be transmitted and received by sensor 20 using conventional antennae. Each sensor 20 is further configured to generate a signal responsive to the reflection of an electromagnetic wave by an object 16, 18. Sensor 20 converts the reflected wave into a digital signal for further use within system 14.

Controller 22 determines whether objects 16, 18 on either side of vehicle 10 detected by sensors 20 justify a warning to the vehicle operator or some other action including autonomous control of system 12. Controller 20 may comprise a programmable microprocessor or microcontroller or may comprise an application specific integrated circuit (ASIC). Controller 22 may include a central processing unit (CPU). Controller 22 may also include an input/output (I/O) interface through which controller 22 may receive a plurality of input signals and transmit a plurality of output signals. The input signals may include signals from sensors 20 indicative of the presence of objects 16, 18 on a side of vehicle 10. The output signals may include signals used to control operator interface 24 or power steering system 12. In the illustrated embodiment, a single controller 22 is shown that receives signals generated by each of sensors 20. It should be understood, however, that separate controllers could be configured to receive signals from one or more sensors and to communicate with one another. For example, separate controllers could receive signals generated by each sensor 20 or separate controllers could receive signals from all sensors 20 on a corresponding side of vehicle 10. It should also be understood that controller 22 could form a part of sensors 20, interface 24, steering system 12 or another component or system of vehicle 10 or may form a freestanding unit. Finally, it should also be understood that the functionality of controller 22 described herein may be divided among multiple sub-controllers forming parts of sensors 20, interface 24, steering system 12 or another component or system of vehicle 10 such that the actions hereinafter described are subdivided among various vehicle components and systems.

Figure 2A:
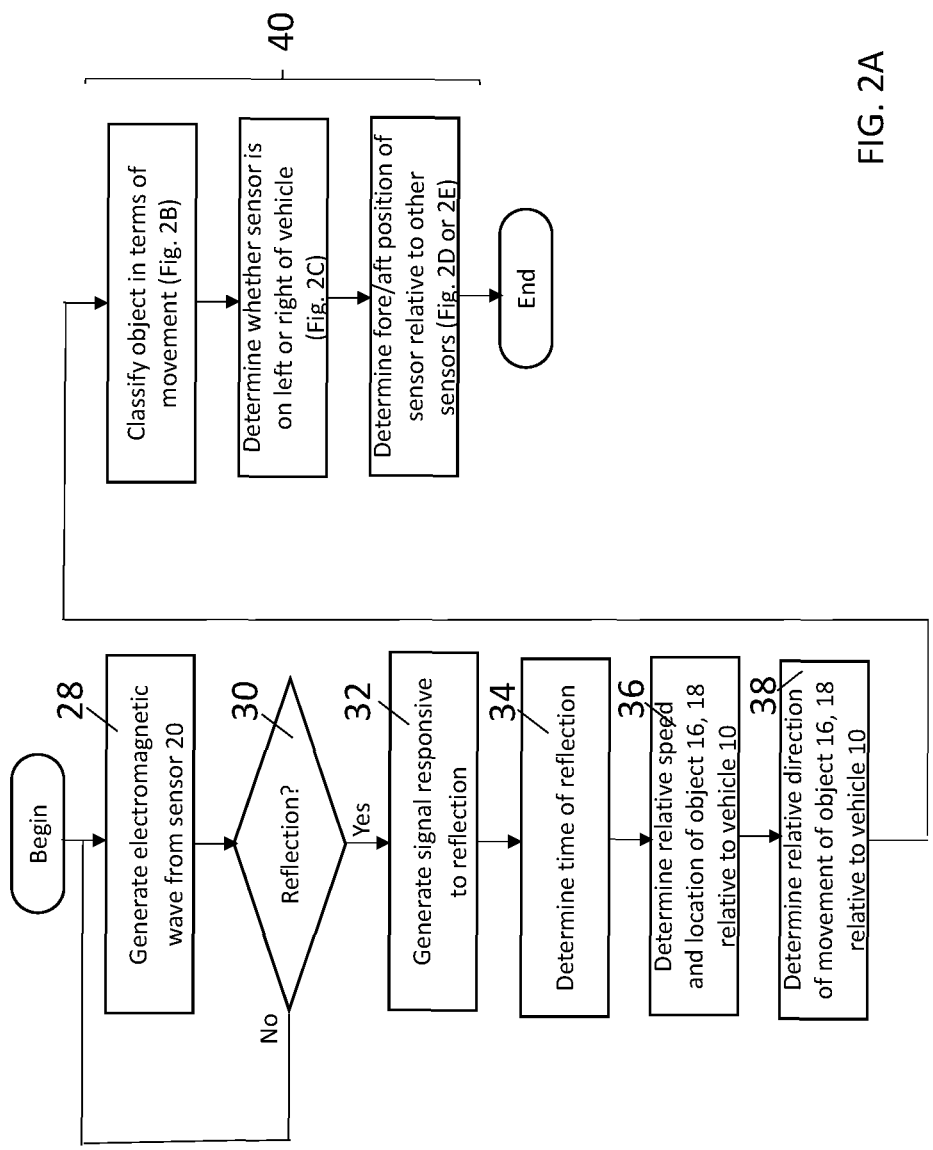

In accordance with the present teachings, controller 22 may be configured with appropriate programming instructions (i.e., software or a computer program) to implement a method for determining the position of each sensor 20 on vehicle 10 as described hereinbelow. Some or all of the programming instructions may be encoded on a non-transitory computer storage medium and executed by the controller 22. Referring now to FIG. 2A, one embodiment of a method for determining the position of a sensor 20 on vehicle 10 may begin with the step 28 of generating an electromagnetic wave from a sensor 20 disposed on one side of vehicle 10. Sensor 20 may continuously generate waves within a field of view 26 of the sensor 20. The method may continue with the step 30 of receiving a reflection of the electromagnetic wave from an object 16, 18 passing through the field of view 26. Objects 16, 18 pass through the field of view 26 of a sensor 20 due to relative motion between the objects 16, 18 and vehicle 10. The objects 16, 18 may be moving—such as a vehicle 16 in an adjacent lane of traffic that is travelling faster or slower than vehicle 10. The objects 16, 18 may also be stationary—such as a fixed body 18 of road infrastructure being passed by vehicle 10. The method may continue with the step 32 of generating a signal from the sensor 20 responsive to the reflection of the electromagnetic wave by the object 16, 18. Sensor 20 converts the reflected wave (as detected by a receiving antenna in sensor 20) to an electric signal for further use within system 14.

The method may continue with several steps 34, 36, 38 in which information relating to the relative movement of objects 16, 18 and vehicle 10 is gathered from the signal generated by sensor 20. As discussed below, the information may be used to determine the position of sensor 20 on vehicle 10 and may include the time at which the object 16, 18 was in the field of view 26 of a sensor 20, the relative speed of the object 16, 18 relative to vehicle 10 and the relative direction of movement of the object 16, 18 relative to vehicle 10. The information gathered from the signal may be stored in a record or another data structure within a relational database that is stored within a memory within controller 22 or accessible by controller 22 over the vehicle communications bus. Although steps 34, 36, 38 are illustrated in FIG. 2A as occurring in a specific sequence, it should be understood that steps 34, 36, 38 could be performed in any order and that some or all of steps 34, 36, 38 could be performed simultaneously as opposed to sequentially.

The sequence of steps may begin with the step 34 of determining a time of the reflection of the electromagnetic wave by the object 16, 18. Controller 22 may assign a time to the reflection based, for example, on a clock signal from a conventional crystal oscillator. The time may be based on the time of receipt of the signal from sensor 20 or an offset from the time of receipt. Alternatively, sensor 20 may itself assign a time to the reflection and encode the time on the signal for retrieval by controller 22.

The method may continue with the step 36 of determining, responsive to the signal, a relative speed of the object 16, 18 relative to vehicle 10. As noted above, objects 16, 18 pass through the field of view 26 of each sensor 20 due to relative motion between the object 16, 18 and vehicle 10. In substep 36, controller 22 determines a relative speed of the object 16, 18 responsive to the signal generated by sensor 20. The relative speed may be a negative value (e.g., in the case of a stationary object 18 passed by vehicle 10) or positive value (e.g., in the case of a moving object 16 passing vehicle 10). In the embodiment in which sensors 20 comprise radar sensors, controller 22 is able to determine the relative speed of object 16, 18 in a conventional manner due to alterations in the frequency of the reflected wave relative to the emitted wave. In an embodiment in which sensors comprise lidar sensors, controller 22 is able to determine the relative speed of object 16, 18 by determining the difference in time between emitted pulses and reflections over a period of time.

The method may continue with the step 38 of determining, responsive to the signal generated by sensor 20, a relative direction of movement of object 16, 18 relative to vehicle 10. Controller 22 determines the relative direction of movement of object 16, 18 relative to vehicle 10 by determining the direction of movement of object 16, 18 through the field of view 26 of a sensor 20 (i.e., left to right or right to left). In an embodiment in which sensors 20 comprise radar sensors, the direction of movement of object 16, 18 can be determined by increases or decreases in the frequency of the reflected waves with the frequency increasing as an object 16, 18 moves closer to the centerline of the field of view 26 and decreasing as an object 16, 18 moves away from the centerline of the field of view 26.

The method continues with the step 40 of determining a position of a sensor 20 on vehicle 10 responsive to the relative speed and the relative direction of movement of an object 16, 18 relative to vehicle 20. Referring to FIG. 2B, step 40 may begin with several substeps to determine whether an object 16, 18 detected by a sensor 20 should be classified as stationary, in motion, or unknown/indeterminate. In general, accuracy in determining the position of sensor 20 is greatest when an object 16, 18 is stationary. In the case of moving objects 16, 18, accuracy increases when a difference in speed between a detected object 16, 18 and vehicle 10 is relatively large. In substep 42 controller 22 determines a vehicle speed of vehicle 10. Systems and methods for determining vehicle speed are well known and vehicle speed is used in a wide variety of vehicle systems. For example, conventional wheel speed sensors may be used to generate the vehicle speed which may then be used in engine control and braking systems among other vehicle systems. Therefore, controller 22 may determine vehicle speed either by receiving a signal transmitted on the vehicle communications bus and indicative of vehicle speed or by accessing a memory where current vehicle speed is stored. Alternatively, controller 22 may be configured to compute vehicle speed responsive to values generated by wheel speed or similar sensors. In substep 44, controller 22 computes the ground speed of object 16, 18 responsive to the vehicle speed obtained in substep 42 and the relative speed of object 16, 18 obtained in step 36 (e.g., by computing the sum of the vehicle speed and the relative speed of object 16, 18). In substep 46, controller classifies the object 16, 18 as stationary, moving or unknown responsive to the ground speed of object 16, 18. Substep 46 may itself proceed with several substeps 48, 50 in which controller 22 determines whether the ground speed of object 16, 18 meets one or more predetermined conditions relative to predetermined thresholds. In substep 48, for example, controller 22 may determine whether the ground speed falls within a predetermined range of speeds less than and greater than zero (e.g., where the ground speed is more than −5 miles per hour and less than five miles per hour) relative to the vehicle 10 and including any measurement error and whether the ground speed falls within the range for more than a predetermined period of time (e.g., 250 milliseconds). If controller 22 determines that the ground speed of object 16, 18 meets these conditions, controller 22 may classify the object 16, 18 as stationary (it being understood that "stationary" as used herein refers to objects that are motionless or moving at relatively low speeds). If the ground speed does not meet these conditions, controller may proceed to substep 50 in which controller may determine whether the ground speed is greater than a predetermined threshold speed (e.g., where the ground speed is greater than 20 miles per hour) and whether the ground speed remains above this threshold for more than a predetermined period of time (e.g., 3 seconds). If controller 22 determines that the ground speed meets these conditions, controller 22 may classify the object 16, 18 as moving. If controller 22 determines that the ground speed does not meet these conditions, controller 22 classifies the object 16, 18 as unknown or indeterminate and disregards the measurements.

Figure 2C:
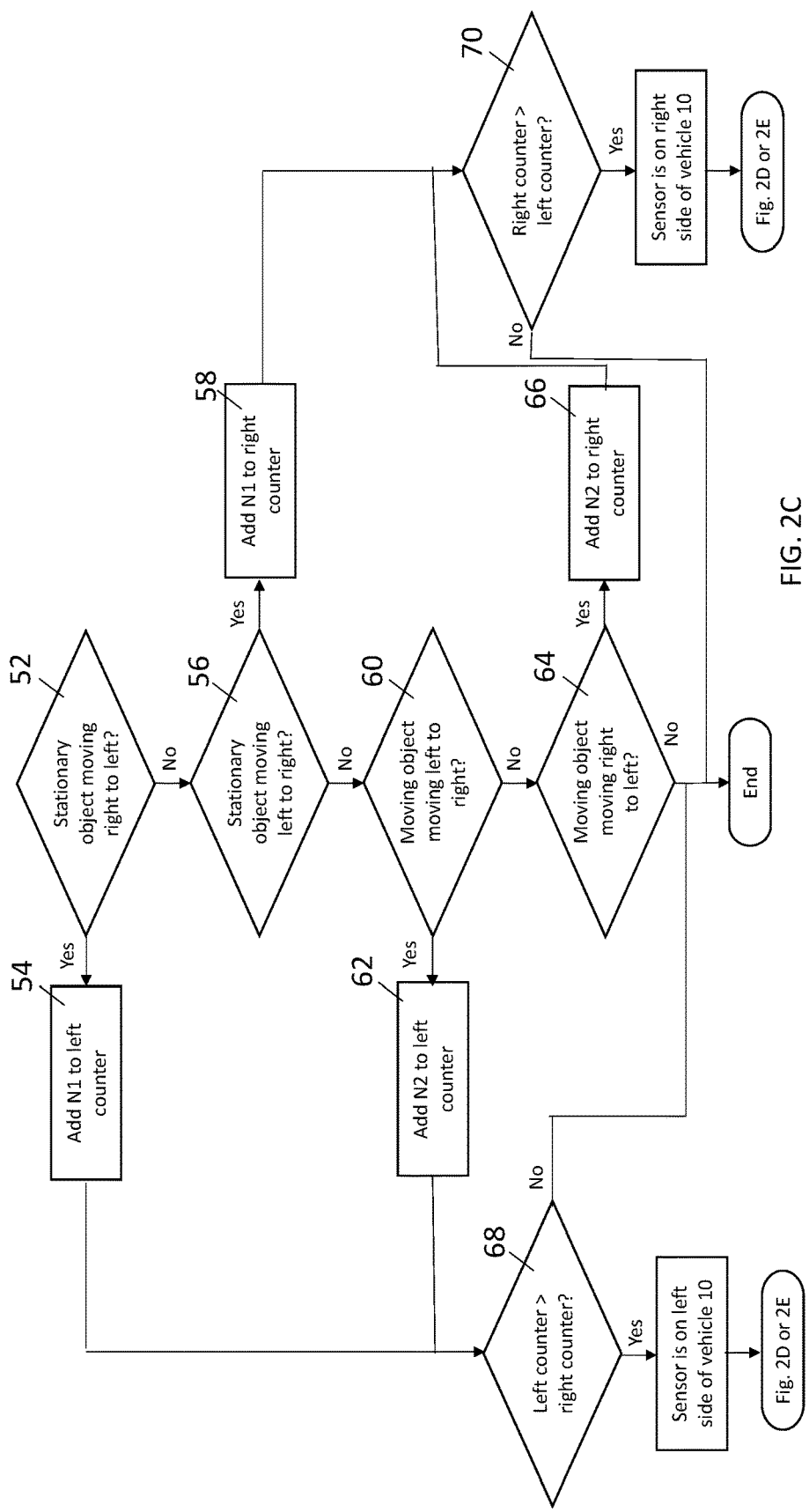

Referring to FIGS. 2A and 2C, step 40 may continue with several substeps to determine whether the sensor 20 detecting the object 16, 18 is located on the left or right side of vehicle 10. Referring to FIG. 2C, in substep 52 controller 22 determines whether the object 16, 18 is stationary (FIG. 2B, substep 46) and is moving right to left (FIG. 2A, step 38) relative to vehicle 10. Because vehicle 10 is typically moving in a forward direction, a stationary object moving right to left in the field of view 26 of a sensor 20 will typically be on the left side of vehicle 10. Therefore, controller 22 increments a left counter stored in a memory within controller 22 or accessible by controller 22 and associated with the sensor 20 by a value N1 in substep 54. If object 16, 18 is not stationary or is not moving right to left, controller 22 moves to substep 56. In substep 56, controller 22 determines whether the object 16, 18 is stationary (FIG. 2B, substep 46) and is moving left to right (FIG. 2A, step 38) relative to vehicle 10. When vehicle 10 is moving in a forward direction, a stationary object moving left to right in the field of view 26 of a sensor 20 will typically be on the right side of the vehicle 10. Therefore, controller 22 increments a right counter stored in memory and associated with the sensor 20 by value N1 in substep 58. If object 16, 18 is not stationary or is not moving left to right, controller 22 moves to substep 60. In substep 60, controller 22 determines whether the object 16, 18 is moving (FIG. 2B, substep 46) and is moving left to right (FIG. 2A, step 38) relative to vehicle 10. The embodiment illustrated in FIG. 2C is intended for use in a heavy vehicle such that objects 16, 18 that are classified as "moving" relative to vehicle 10 will typically be other vehicles passing vehicle 10. Therefore, an object 16, 18 that is in motion and is moving left to right in the field of view 26 of a sensor 20 will typically be on the left side of vehicle 10 while an object 16, 18 that is in motion and is moving right to left in the field of view 26 of a sensor 20 will typically be on the right side of the vehicle. It should be understood, however, that the logic illustrated herein could be modified to account for different types of vehicles and uses. If the object 16, 18 is moving and is moving left to right relative to vehicle 10, controller 22 may increment the left counter by a value N2 in substep 62. Because measurements taken relative to stationary objects are likely to have greater accuracy than those in motion, N1 may have a value greater than N2. It should be understood, however, that N2 could be greater than N1 or even the same as N1 in some embodiments. If object 16, 18 is not moving or is not moving left to right, controller 22 moves on to substep 64. In substep 64, controller 22 determines whether the object 16, 18 is moving (FIG. 2B, substep 46) and is moving right to left (FIG. 2A, step 38) relative to vehicle 10. If so, controller 22 may increment the right counter by value N2 in substep 66. Following substeps 54 or 62 (i.e., instances in which controller 22 has determined based on measurements associated with a particular object 16, 18 that a given sensor 20 is likely on the left side of vehicle 10), controller 22 may determine in substep 68 whether the value of the left counter relating to the sensor 20 is greater than the value of the right counter relating to the sensor 20. If so, controller 22 determines that sensor 20 is on the left side of vehicle 10. Similarly, following substeps 58 or 66 (i.e., instances in which controller 22 has determined based on measurements associated with a particular object 16, 18 that a given sensor 20 is likely on the right side of vehicle 10), controller 22 may determine whether the value of the right counter relating to the sensor 20 is greater than the value of the left counter relating to the sensor 20. If so, controller 22 determines that sensor 20 is on the right side of vehicle 10.

The steps illustrated in FIGS. 2A, 2B and 2C may be performed one or more times for each sensor 20 on vehicle 10. Thus, each sensor 20 may perform the steps 28, 30, 32 of generating an electromagnetic wave within a corresponding field of view 26 on one side of vehicle 10, receiving a reflection of the wave from an object 16, 18 passing through the field of view 26, and generating a signal responsive to the reflection. Controller 22 (which again may be a central controller acting on signals from each sensor 20 or a collection of individual controllers each associated with a single sensor 20 or a subset of sensors 20) may then perform the step 34 of determining a time of reflection of the wave by the object 16, 18, the step 36 of determining an object speed of the object 16, 18, the step 38 of determining, responsive to the signal, a relative direction of movement of the object 16, 18 relative to vehicle 10. Finally, controller 22 may perform the substeps illustrated in FIGS. 2B and 2C. As a result of these steps, controller 22 will know as to each sensor 20 whether the sensor 20 is on the left or right side of vehicle 10 relative to its centerline CL in the direction of vehicle travel.

Figure 2D:
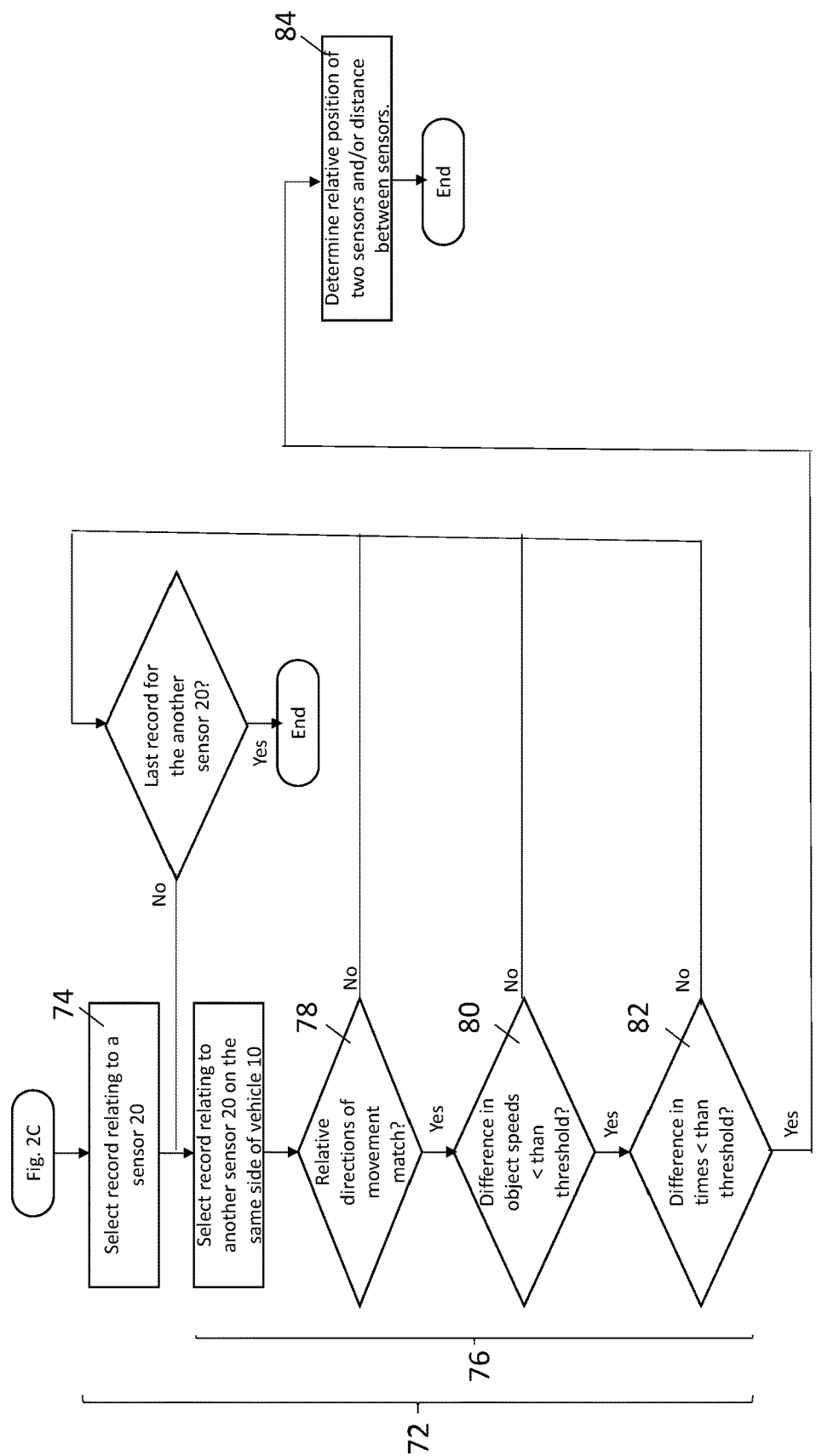
Figure 2E:
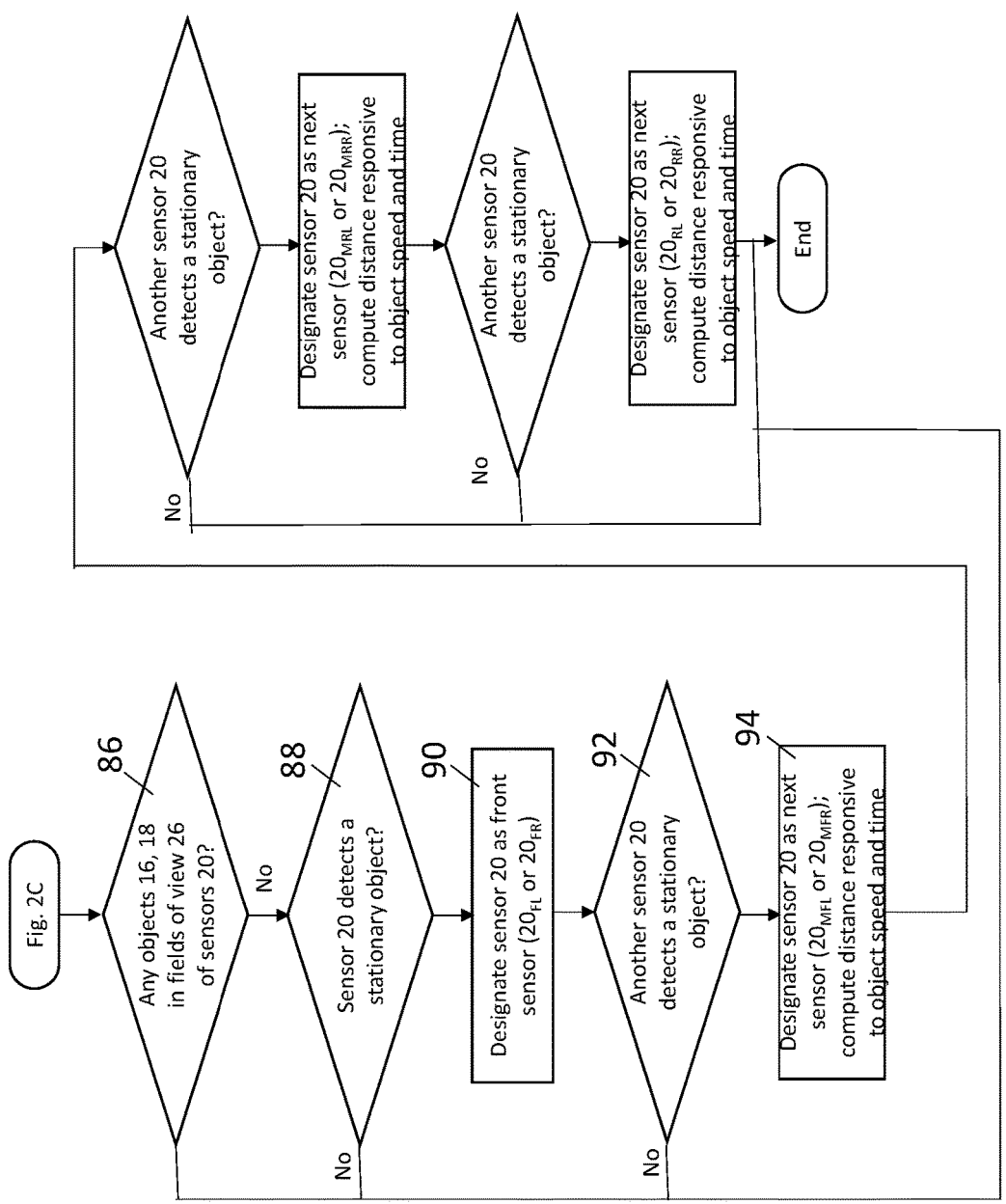

Referring to FIGS. 2A, 2D and 2E, once controller 22 has determined which side of vehicle 10 each sensor 20 is located on, controller 22 may perform additional steps to determine the relative positions of the sensors 20 on each side of the vehicle (i.e. determine whether a given sensor 20 on one side of the vehicle 10 is further forward or rearward of another sensor 20 on that side of the vehicle 10). In this manner, the fore-aft position of each sensor 20 on vehicle 10 can be determined. In the case of a truck or other commercial vehicle complying with SAE standard J1939, each sensor 20 can then be categorized in one of eight standard locations on vehicle 10 (front left, mid front left, mid rear left, rear left, front right, mid front right, mid front right and rear right). Controller 22 is able to determine the relative fore-aft positions of sensors 20 on each side of vehicle 10 by tracking the movement of an object 16, 18 passing through the fields of view 26 of multiple sensors 20.

Referring to FIG. 2D, to determine the relative position of sensors 20 on each side of vehicle 10, the method may, in one embodiment, continue with the step 70 of identifying records that relate to the passage of the same object 16, 18 through the fields of view 26 of multiple sensors 20. Controller 22 can identify records relating to the same object 16, 18 by comparing one or more of (i) times at which an object 16, 18 passed through the field of view 26 of a sensor 20 (see FIG. 2A, step 34), (ii) the relative speed of the object 16, 18 passing through the field of view 26 (See FIG. 2A, step 36), and (iii) the relative direction of movement of the object 16, 18 relative to vehicle 10 (see FIG. 2A, step 38). In particular, an object 16, 18 passing through the fields of view 26 of two adjacent sensors 20 will typically be moving in the same direction relative to the vehicle 10 through both fields of view 26 (i.e. left to right or right to left). The object 16, 18 is also likely to have the same or substantially the same speed as it passes through the fields of view 26 of adjacent sensors 20. The object 16, 18 is also likely to pass through the two fields of view 26 at times that are relatively close to one another. In one embodiment, controller 22 begin step 72 with the substep 74 of selecting a record relating to a sensor 20 such as sensor $20_{MFL}$. The record will have information including the time that a particular object 16 passed the sensor $20_{MFL}$, the speed of the object 16 and the relative direction of movement of the object 16 relative to vehicle 10. In substep 76, controller 22 searches for a record relating to the same object 16 as detected by another sensor 20 on the same side of vehicle 10 such as sensor $20_{FL}$. In searching for the record, controller 22 may perform several substeps. For example, for each record relating to sensor $20_{FL}$, controller 22 may first compare the relative direction of movement recorded in the record to the relative direction of movement recorded in the record obtained in substep 74 (see FIG. 2B, block 78). If the directions match, controller 22 may compare the recorded relative speed of the object 16, 18 in the record for sensor $20_{FL}$ to the speed recorded in the record obtained in substep 74 for sensor $20_{FML}$ to see if the recorded speed meets a predetermined condition relative to the speed recorded in the record obtained in substep 74 (e.g., is within two (2) miles per hours of the speed) (See FIG. 2B, block 80). If the condition is met, controller may compare the recorded time in the record for sensor $20_{FL}$ to the time recorded in the record obtained in substep 74 for sensor $20_{FML}$ to see if the recorded time meets a predetermined condition relative to the time recorded in the record obtained in substep 74 (see FIG. 2B, block 82). For example, controller 22 may see if difference in the two times is within a predetermined limit (thereby indicating that the records relate to the same object 16 and not two different objects that happened to move in similar directions at similar speeds, but at different times). If the two times are within the limit, controller 22 will determine that the two records do, in fact, relate to passage of the same object 16 past multiple sensors $20_{FML}$, $20_{FL}$ and move on to subsequent steps in the method. If the any of the above conditions are not met, however, controller 22 will continue to search records relating to sensor $20_{FL}$ until a record meeting all of the conditions is met or no more records are found.

Once a record for sensor $20_{FL}$ is identified in substep 76 that relates to the same object as the record obtained in substep 74 for sensor $20_{FML}$, the method may continue with the step 84 of determining a relative position of sensor $20_{FL}$ relative to sensor $20_{FML}$. Using the relative direction of movement and the time in each of the two records, a determination can be made whether a sensor $20_{FL}$ is forward or rearward of another sensor $20_{FML}$. For example, if the two sensors $20_{FL}$, $20_{FML}$ are on the left side of the vehicle and the direction of movement of the object 16 is left to right, the sensor $20_{FML}$ with the earlier timestamp will be rearward of the other sensor $20_{FL}$. If the direction of movement of the object is right to left, the sensor $20_{FL}$ with the earlier timestamp will be forward of the other sensor $20_{FML}$. If the two sensors are on the right side of the vehicle such as sensors $20_{FR}$ and $20_{FMR}$ and the direction of movement of the object 18 is left to right, the sensor $20_{FR}$ with the earlier timestamp will be forward of the other sensor $20_{FMR}$. If the direction of movement of the object 18 is right to left, the sensor $20_{FMR}$ with the earlier timestamp will be rearward of the other sensor $20_{FR}$. Using the speed of the object 16, 18 and the time in each of the two records, a determination can also be made regarding the distance between the sensors 20. In particular, multiplying the speed of the object 16, 18 by the difference in the two times will provide the distance of travel of the object 16, 18 between the two sensors 20 and, therefore, the distance between the sensors 20 (because the object speed may vary somewhat between the two records, the object speed may be assigned as an average of the speeds recorded in the two records for purposes of computing the distance). The distance provides an indication of how much further forward or rearward one sensor 20 is relative to another on vehicle 10 thereby allowing system 14 to more easily identify the precise position of each sensor 20. For example, in the case of three sensors 20 located at the front, middle and rear on one side of the vehicle, the distance may enable system 14 to determine that a sensor 20 is not only forward of the rear sensor (as the front and middle sensors would be), but that the sensor 20 is, for example, the forward sensor as opposed to the middle sensor.

Referring to FIG. 2E, in another embodiment, the relative position of sensors 20 on each side of vehicle 10 is determined by tracking a stationary object 16, 18 as it passes through the fields of view 26 of consecutive sensors. In this embodiment, controller 22 may begin in substep 86 by insuring that there are not any stationary objects currently within the field of view 26 of any of sensors 20. If this condition is met, controller 22 determines in substep 88 when a stationary object enters the field of view 26 of a sensor 20. In this embodiment, it is assumed that an operator will move vehicle 10 in a forward direction to set or calibrate sensors 20. Therefore, once controller 22 determines that an object 16, 18 is within the field of view 26 of a sensor, controller 22 designates the sensor as the forward sensor on vehicle 10 (i.e., $20_{FL}$ or $20_{FR}$ in the vehicle 10 illustrated in FIG. 1) in substep 90. Controller 22 then determines in substep 92 when the object 16, 18 enters the field of view 26 of another sensor 20. Once this occurs, controller 22 designates this sensor in substep 94 as being located to the rear of the first sensor and the closet sensor to the first sensor (i.e. $20_{MFL}$ or $20_{MRL}$ in the vehicle illustrated in FIG. 1). In the same substep, controller 22 may determine the distance between the two sensors 20 in the manner described hereinabove. In particular, using the speed of the object 16, 18 and the time the object 16, 18 passed through the field of view 26 of each sensor, a determination can also be made regarding the distance between the sensors 20. Multiplying the speed of the object 16, 18 by the difference in the two times will provide the distance of travel of the object 16, 18 between the two sensors 20 and, therefore, the distance between the sensors 20 (because the object speed may vary as it passes each sensor 20, the object speed may be assigned as an average of the speeds recorded at each sensor for purposes of computing the distance). As illustrated in FIG. 2E, substeps similar to substeps 92, 94 may be performed to determine the relative position, and distance between, any additional sensors as the vehicle 10 continues past the stationary object 16, 18 and the object 16, 18 passes through the field of view 26 of the remaining sensors.

Referring again to FIG. 1, operator interface 24 is provides a means for warning the vehicle operator that an object is located in a blind spot. Interface 24 may include light emitters, such as light emitting diodes, or sound emitters, such as a speaker, to convey visual and/or audio warnings. In the case of visual warnings, information about the location of the object (e.g., left or right side of the vehicle and fore-aft location of the object relative to the vehicle) or other characteristics of the object (e.g., speed) can be conveyed through differences in color, differences in intensity, differences in the number of lights, and differences in the pattern of activation of the lights. In the case of audio warnings, similar information can be conveyed through differences in the type of sound generated, differences in volume and differences in the pattern of sounds.

A system and method for determining the positions of one or more collision avoidance sensors on a vehicle 10 in accordance the present teachings represent an improvement as compared to conventional systems and methods. In particular, the system and method enable a sensor 20 to learn its position on vehicle 10 as well as its position relative to other sensors 20 based on the speed and direction of movement of objects 16, 18 in the field of view 26 of the sensor 20 relative to the speed and direction of movement of vehicle 10. As a result, a single sensor can be used at any position on vehicle 10 without modifications to other vehicle components. By using a single sensor, manufacturers avoid the costs of manufacturing and programming multiple sensors. Further, installation of the sensors on vehicle 10 is much quicker and the risk of improper installation of the sensor is significantly reduced.

While the invention has been shown and described with reference to one or more particular embodiments thereof, it will be understood by those of skill in the art that various changes and modifications can be made without departing from the spirit and scope of the invention.

What is claimed is:

1. A system for determining the positions of one or more collision avoidance sensors on a vehicle, comprising:
    a first sensor disposed on the vehicle, the first sensor configured to generate a first electromagnetic wave within a first field of view on a first side of the vehicle and to receive a reflection of the first electromagnetic wave from a first object passing through the first field of view;
    a second sensor disposed on the vehicle, the second sensor configured to generate a second electromagnetic wave within a second field of view on the first side of the vehicle and to receive a reflection of the second electromagnetic wave from the first object passing through the second field of view;
    a controller configured to
        receive a first signal generated by the first sensor responsive to the reflection of the first electromagnetic wave by the first object;
        determine, responsive to the first signal, a first relative speed of the first object relative to the vehicle;
        determine, responsive to the first signal, a first relative direction of movement of the first object relative to the vehicle;
        receive a second signal generated by the second sensor responsive to the reflection of the second electromagnetic wave by the first object;
        determine, responsive to the second signal, a second relative speed of the first object relative to the vehicle;
        determine, responsive to the second signal, a second relative direction of movement of the first object relative to the vehicle;
        determine a position of the first sensor on the vehicle relative to a centerline of the vehicle in the direction of vehicle travel by
            determining whether the first object is stationary or moving;
            incrementing a left counter by a first value when the first object is stationary and the first relative direction of movement is in a first direction and by a second value when the first object is moving and the first relative direction of movement is in a second direction;
            incrementing a right counter by the first value when the first object is stationary and the first relative direction of movement is in the second direction and by the second value when the first object is moving and the first relative direction of movement is in the first direction;
            determining whether the first sensor is located on a left side of the centerline or a right side of the centerline responsive to a comparison between the left counter and the right counter;
        determine a position of the first sensor in a fore-aft direction relative to the second sensor responsive to a first time of the reflection of the first electromagnetic wave by the first object and a second time of the reflection of the second electromagnetic wave by the first object.

2. The system of claim 1 wherein the controller is further configured, in determining whether the first object is stationary or moving, to:
    determine a vehicle speed of the vehicle;
    compute a ground speed of the first object responsive to the first relative speed and the vehicle speed; and,
    classify the first object as one of stationary, moving or unknown responsive to the ground speed.

3. An article of manufacture, comprising:
    a non-transitory computer storage medium having a computer program encoded thereon that when executed by a controller determines the positions of one or more collision avoidance sensors on a vehicle, the computer program including code for:
    determining a first relative speed of an object relative to the vehicle responsive to a first signal generated by a first sensor disposed on the vehicle, the first signal generated by the first sensor in response to reflection by the object of a first electromagnetic wave generated by the first sensor within a first field of view on a first side of the vehicle when the object passes through the first field of view;
    determining, responsive to the first signal, a first relative direction of movement of the object relative to the vehicle;
    determining a second relative speed of the object relative to the vehicle responsive to a second signal generated by a second sensor disposed on the vehicle, the second signal generated by the second sensor in response to reflection by the object of a second electromagnetic wave generated by the second sensor within a second field of view on the first side of the vehicle when the object passes through the second field of view;
    determining, responsive to the second signal, a second relative direction of movement of the object relative to the vehicle;
    determining a position of the first sensor on the vehicle relative to a centerline of the vehicle in the direction of vehicle travel by
        determining whether the object is stationary or moving;
        incrementing a left counter by a first value when the object is stationary and the first relative direction of movement is in a first direction and by a second value when the object is moving and the first relative direction of movement is in a second direction;

incrementing a right counter by the first value when the object is stationary and the first relative direction of movement is in the second direction and by the second value when the object is moving and the first relative direction of movement is in the first direction;

determining whether the first sensor is located on a left side of the centerline or a right side of the centerline responsive to a comparison between the left counter and the right counter;

determining a position of the first sensor in a fore-aft direction relative to the second sensor responsive to a first time of the reflection of the first electromagnetic wave by the first object and a second time of the reflection of the second electromagnetic wave by the first object.

4. The article of manufacture of claim 3 wherein the code for determining whether the object is stationary or moving includes code for determining a vehicle speed of the vehicle;

computing a ground speed of the object responsive to the first relative speed and the vehicle speed; and, classifying the object as one of stationary, moving or unknown responsive to the ground speed.

5. A method for determining the positions of one or more collision avoidance sensors on a vehicle, comprising the steps of:

generating a first electromagnetic wave from a first sensor disposed on the vehicle, the first electromagnetic wave generated within a first field of view on a first side of the vehicle;

receiving a reflection of the first electromagnetic wave from an object passing through the first field of view;

generating a first signal from the first sensor responsive to the reflection of the first electromagnetic wave by the object;

determining, responsive to the first signal, a first relative speed of the object relative to the vehicle;

determining, responsive to the first signal, a first relative direction of movement of the object relative to the vehicle;

generating a second electromagnetic wave from a second sensor disposed on the vehicle, the second electromagnetic wave generated within a second field of view on the first side of the vehicle;

receiving a reflection of the second electromagnetic wave from the object passing through the second field of view;

generating a second signal from the second sensor responsive to the reflection of the second electromagnetic wave by the object;

determining, responsive to the second signal, a second relative speed of the object relative to the vehicle;

determining, responsive to the second signal, a second relative direction of movement of the object relative to the vehicle;

determining a position of the first sensor on the vehicle relative to a centerline of the vehicle in the direction of vehicle travel by determining whether the object is stationary or moving;

incrementing a left counter by a first value when the object is stationary and the first relative direction of movement is in a first direction and by a second value when the object is moving and the first relative direction of movement is in a second direction;

incrementing a right counter by the first value when the object is stationary and the first relative direction of movement is in the second direction and by the second value when the object is moving and the first relative direction of movement is in the first direction;

determining whether the first sensor is located on a left side of the centerline or a right side of the centerline responsive to a comparison between the left counter and the right counter;

determine a position of the first sensor in a fore-aft direction relative to the second sensor responsive to a first time of the reflection of the first electromagnetic wave by the first object and a second time of the reflection of the second electromagnetic wave by the first object.

6. The method of claim 5 wherein the step of determining whether the object is stationary or moving includes the substeps of:

determining a vehicle speed of the vehicle;

computing a ground speed of the object relative to the vehicle responsive to the first relative speed and the vehicle speed; and, classifying the object as one of stationary, moving or unknown responsive to the ground speed.

7. The system of claim 1 wherein the second value is less than the first value.

8. The system of claim 1 wherein the controller is further configured, in determining the position of the first sensor in the fore-aft direction relative to the second sensor, to:

identify a first record corresponding to the first signal and including the first time of the reflection of the first electromagnetic wave by the first object;

identify a second record corresponding the second signal and including the second time of the reflection of the second electromagnetic wave by the first object; and compare the first and second times.

9. The system of claim 1 wherein the controller is further configured, in determining the position of the first sensor in the fore-aft direction relative to the second sensor, to:

designate the first sensor as forward of the second sensor if the first time occurs before the second time; and, designate the first sensor as rearward of the second sensor if the first time occurs after the second time.

10. The system of claim 1 wherein the controller is further configured to determine a distance between the first sensor and the second sensor responsive to the first time, the second time, and at least one of the first relative speed and the second relative speed.

11. The system of claim 10 wherein the controller is configured to determine the distance only when a difference between first and second relative speeds meets a predetermined condition.

12. The system of claim 10 wherein the controller is configured to determine the distance responsive to an average of the first and second relative speeds.

13. The article of manufacture of claim 3 wherein the second value is less than the first value.

14. The article of manufacture of claim 3 wherein the code for determining the position of the first sensor in the fore-aft direction relative to the second sensor includes code for:

identifying a first record corresponding to the first signal and including the first time;

identifying a second record corresponding the second signal and including the second time; and comparing the first and second times.

15. The article of manufacture of claim 3 wherein the code for determining the position of the first sensor in the fore-aft direction relative to the second sensor includes code for:
   designating the first sensor as forward of the second sensor if the first time occurs before the second time; and,
   designating the first sensor as rearward of the second sensor if the first time occurs after the second time.

16. The article of manufacture of claim 3 wherein the computer program further includes code for determining a distance between the first sensor and the second sensor responsive to the first time, the second time and at least one of the first relative speed and the second relative speed.

17. The article of manufacture of claim 16 wherein the computer program only executes the code for determining when a difference between first and second relative speeds meets a predetermined condition.

18. The article of manufacture of claim 16 wherein the code for determining the distance determines the distance responsive to an average of the first and second relative speeds.

19. The method of claim 5 wherein the second value is less than the first value.

20. The method of claim 5 wherein the step of determining the position of the first sensor in the fore-aft direction relative to the second sensor includes the sub steps of:
   identifying a first record corresponding to the first signal and including the first time;
   identifying a second record corresponding the second signal and including the second time; and
   comparing the first and second times.

21. The method of claim 5 wherein the step of determining the position of the first sensor in the fore-aft direction relative to the second sensor includes the sub steps of:
   designating the first sensor as forward of the second sensor if the first time occurs before the second time; and,
   designating the first sensor as rearward of the second sensor if the first time occurs after the second time.

22. The method of claim 5, further comprising the step of determining a distance between the first sensor and the second sensor responsive to the first time, the second time and at least one of the first relative speed and the second relative speed.

23. The method of claim 22 wherein the step of determining a distance occurs only when a difference between first and second relative speeds meets a predetermined condition.

24. The method of claim 22 wherein the distance is determined responsive to an average of the first and second relative speeds.

* * * * *